US012656483B2

(12) United States Patent
    Gao

(10) Patent No.:   US 12,656,483 B2
(45) Date of Patent:       Jun. 16, 2026

(54) SIGNAL MODELING FOR UNAMBIGUOUS RANGE RATE ESTIMATION

(71) Applicant: Aptiv Technologies AG, Schaffhausen (CH)

(72) Inventor: Boyi Gao, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 295 days.

(21) Appl. No.: 17/809,459

(22) Filed: Jun. 28, 2022

(65) Prior Publication Data

US 2023/0350058 A1     Nov. 2, 2023

Related U.S. Application Data

(60) Provisional application No. 63/364,001, filed on May 2, 2022.

(51) Int. Cl.
G01S 13/931     (2020.01)
G01S 13/58     (2006.01)

(52) U.S. Cl.
CPC ............ G01S 13/931 (2013.01); G01S 13/58 (2013.01)

(58) Field of Classification Search
CPC ............................... G01S 13/931; G01S 13/58
See application file for complete search history.

(56) References Cited

U.S. PATENT DOCUMENTS

| | | | | |
|---|---|---|---|---|
| 11,802,939 B2 * | 10/2023 | Choi | ....................... | G01S 7/356 |
| 2015/0323660 A1 * | 11/2015 | Hampikian | ........... | G01S 13/347 |
| | | | | 342/109 |
| 2020/0057140 A1 * | 2/2020 | Vigier | ................... | G01S 7/4017 |

(Continued)

FOREIGN PATENT DOCUMENTS

| | | |
|---|---|---|
| CN | 105074497 A | 11/2015 |
| CN | 107656280 A | 2/2018 |

(Continued)

OTHER PUBLICATIONS

"Extended European Search Report", EP Application No. 23163099.7, Aug. 2, 2023, 10 pages.

(Continued)

*Primary Examiner* — Vladimir Magloire
(74) *Attorney, Agent, or Firm* — Harness, Dickey & Pierce, P.L.C.

(57)                ABSTRACT

This document describes interleaving chirps for unambiguous range rate estimation. A signal model quickly and unambiguously estimates range rates for any chirp within one frame. During each frame, a transmission of radar signals is caused by interleaving two different groups of chirps (e.g., up-chirps and down-chirps) in an ordered sequence. This unique pattern of chirps enables the signal model to compute an ambiguity term for each frame (e.g., an ambiguity variable for each group). The ambiguity term is often not zero. With ambiguity considered for the frame, range rate estimates can be provided without ambiguity. When applied to a solution for estimating range rate, the ambiguity term allows quick, and unambiguous results to be obtained for any possible detection. Ambiguity is resolved without having to analyze multiple frames. This increase in accuracy and performance enables wider adoption of radar and may promote safe driving.

14 Claims, 10 Drawing Sheets

(56) References Cited

U.S. PATENT DOCUMENTS

| | | | |
|---|---|---|---|
| 2020/0264274 A1* | 8/2020 | Zeng | G01S 13/343 |
| 2021/0247490 A1 | 8/2021 | Fu et al. | |
| 2021/0255303 A1 | 8/2021 | Laghezza et al. | |
| 2021/0278522 A1 | 9/2021 | Kitamura | |
| 2022/0155411 A1 | 5/2022 | Choi et al. | |
| 2022/0209812 A1* | 6/2022 | Hall | H04B 1/69 |

FOREIGN PATENT DOCUMENTS

| | | | |
|---|---|---|---|
| CN | 107966688 A | 4/2018 | |
| DE | 102013205892 A1 | 10/2014 | |
| WO | WO-2014161687 A1 * | 10/2014 | G01S 13/345 |

OTHER PUBLICATIONS

Communication pursuant to Article 94(3) EPC regarding European Patent Application No. 23163099.7, dated Feb. 5, 2026.
First Office Action regarding Chinese Patent Application No. 202310493534.1, dated Mar. 17, 2026. Translation provided by SPTL LLC.

* cited by examiner

100

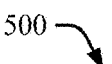

500 —

502 — Transmit radar signals for a frame by interleaving two different groups of chirps into an ordered sequence of chirps such that each consecutive pair of chirps includes an initial chirp from one of the two groups and a subsequent chirp from the other of the two groups.

504 — Based on radar returns obtained in response to transmission of the radar signals, identify initial range and Doppler measurements for each of the two groups.

506 — Select an ambiguity term for each of the two groups, independently, based on the initial range and Doppler measurements for that group.

508 — Use the ambiguity term selected for either of the two groups to estimate an unambiguous range rate for detections associated with the two groups.

510 — Output the unambiguous range rate for at least some of the detections to enable tracking or other radar dependent functions executing on a vehicle.

*FIG. 5*

SIGNAL MODELING FOR UNAMBIGUOUS RANGE RATE ESTIMATION

CROSS-REFERENCE TO RELATED APPLICATION

This application claims the benefit under 35 U.S.C. 119(e) of U.S. Provisional Application No. 63/364,001, filed May 2, 2022, the disclosure of which is hereby incorporated by reference in its entirety herein.

BACKGROUND

Radar systems are used in vehicles as perception systems, for instance, to enable autonomous controls or advanced safety features. Radar signals reflect from objects in fields of view of such systems, and the reflections are processed into useful information about relative position and movement of the objects. Many common driving environments include many different objects moving at different ranges, directions, and speeds. Ambiguity commonly arises in range rate estimates derived in such environments; an estimated range rate may be reported too low because of folding. De-aliasing techniques may be used to eliminate ambiguity; however, de-aliasing works across multiple frames, which introduces latency and diminishes performance. Radar systems need to be able to quickly process returns for many critical vehicle systems; vehicle functions depend on immediate and precise object reporting; if radar detections and their range rate estimates are delayed for too long, unsafe and/or uncomfortable vehicle maneuvers may occur.

SUMMARY

This document describes signal modeling for unambiguous range rate estimation. This Summary is not intended to identify essential features of the claimed subject matter, nor is it intended for use in determining the scope of the claimed subject matter.

In one example, a system includes a processor configured to transmit, from a radar system, radar signals for a frame by interleaving two different groups of chirps into an ordered sequence of chirps such that each consecutive pair of chirps includes an initial chirp from one of the two groups and a subsequent chirp from the other of the two groups. The processor can identify, based on radar returns obtained in response to transmission of the radar signals, initial range and Doppler measurements for each of the two groups. based on the initial range and Doppler measurements for that group, the processor is configured to select, from among a plurality of ambiguity terms used for unambiguously estimating range rates for detections, an ambiguity term for each of the two groups. The ambiguity term for each of the two groups is selected independently. The processor can use the ambiguity term selected for the two groups to estimate an unambiguous range rate for detections associated with either of the two groups.

In addition to this and other examples, methods are described for signal modeling for unambiguous range rate estimation. In some cases, a computer-readable media (CRM) includes instructions that, when executed, cause a processor (e.g., of a radar system) to perform these methods. Systems are contemplated by this disclosure that include various means for performing these methods. Through implementation of these and other examples contemplated by this disclosure, signal modeling for unambiguous range rate estimation can be achieved, leading to safe and accurate driving decisions even in crowded driving situations.

BRIEF DESCRIPTION OF THE DRAWINGS

The details of signal modeling for unambiguous range rate estimation are described in this document with reference to the Drawings, which may use same numbers to reference like features and components, and which may use hyphenated numbers to designate variations of these like features and components. The Drawings are organized as follows:

FIG. 5 illustrates an example process for signal modeling for unambiguous range rate estimation.

DETAILED DESCRIPTION

Existing Signal Models

Figure 1:
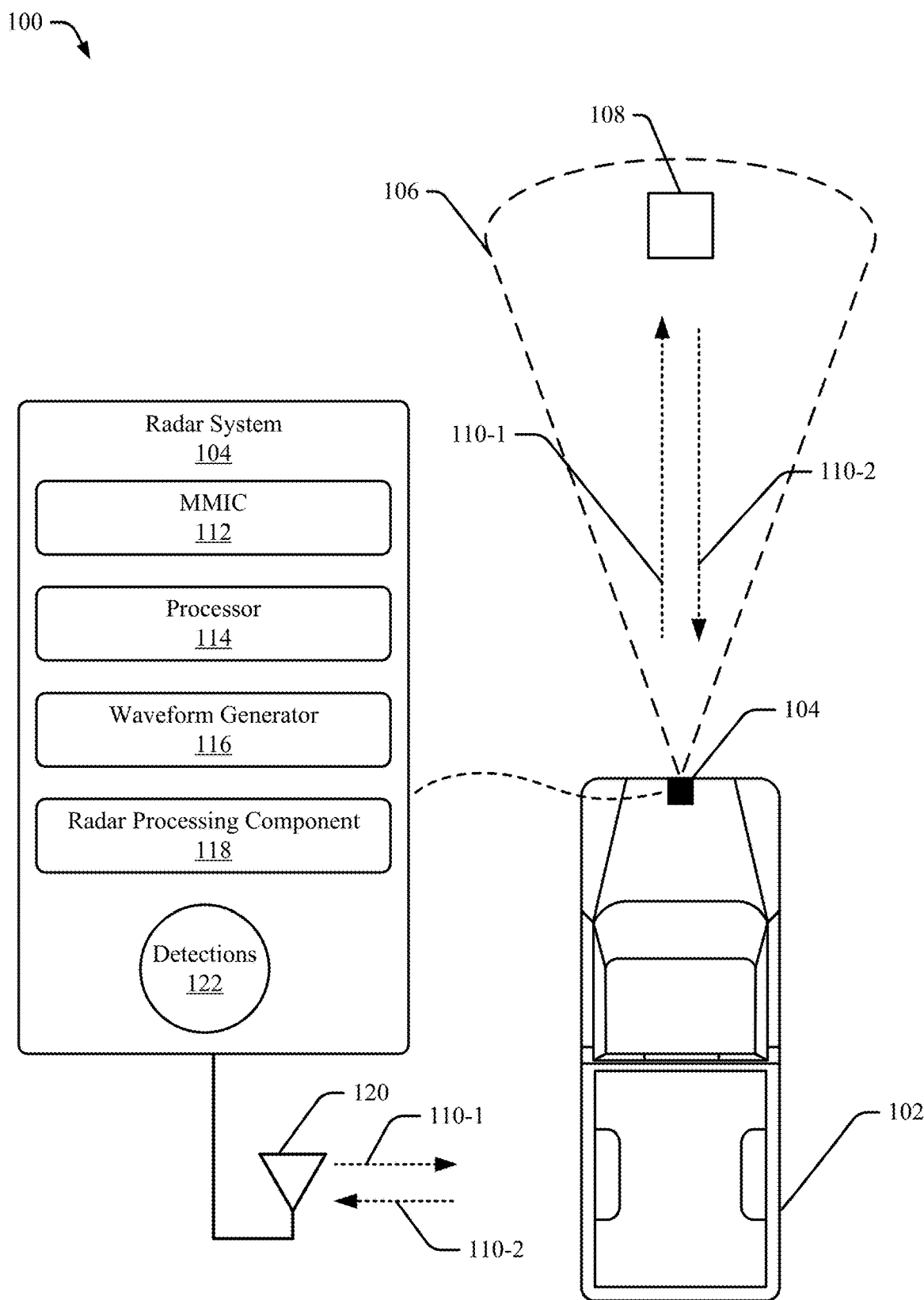
FIG. 1 illustrates an example environment for signal modeling for unambiguous range rate estimation.

Radar systems employ signal models to estimate properties of detections, such as range and range rate. A typical signal model used by radar systems for performing range and range rate estimations of detections adopts a set of linear equations shown below. Equation 1 is used for analyzing detections in the fast-time dimension of the frequency domain, and Equation 2 is used for analyzing detections in the slow-time dimension:

$$F_{b_{Fast-Time}} = p^* \frac{f_s}{M} = -f_{R_1} \cdot R - f_{D_1} \cdot v. \qquad \text{Equation 1}$$

$$F_{b_{Slow-Time}} = q^* \frac{\frac{1}{PRP}}{K} + \frac{N_{ambi}}{PRP} = -f_{R_2} \cdot R - f_{D_2} \cdot v. \qquad \text{Equation 2}$$

In each of Equations 1 and 2, R represents an estimated range for a detection, v represents a range rate (e.g., velocity) for the detection, M is a number of samples per chirp, K is a number of chirps per frame, $f_s$ is a sampling rate, and Pulse Repetition Period (PRP) is a time delay between a first and second chirp within the frame. In Equation 1, p* is a fractional bin estimate for the fast-time dimension. In Equation 2, q* is the fractional bin estimate for the slow-time dimension.

Equations 3 and 4 define, respectively, a ranging frequency $f_{R_1}$ in the fast-time dimension for solving Equation 1, and a ranging frequency $f_{R_2}$ in the slow-time dimension for solving Equation 2:

$$f_{R_1} = \frac{2 \cdot S}{c}. \qquad \text{Equation 3}$$

$$f_{R_2} = \frac{2 \cdot \frac{\Delta f}{PRP}}{c}. \qquad \text{Equation 4}$$

In each of Equations 3 and 4, c is a constant representing the speed of light through air. The term S from Equation 3 is a slope rate of a chirp, and the term $\Delta f$ in Equation 4 is a frequency step between chirps.

A modified Doppler frequency $f_{D_1}$ in the fast-time dimension for solving Equation 1, and a modified Doppler frequency $f_{D_2}$ in the slow-time dimension for solving Equation 2, can be found from solving Equations 5 and 6, respectively:

$$f_{D_1} = f_D + \left(f_{R_1} \cdot a + f_{R_2}\right) \cdot \frac{K-1}{2} \cdot PRP. \qquad \text{Equation 5}$$

$$f_{D_2} = f_D + \left(f_{R_1} + f_{R_2}\right) \cdot \frac{M-1}{2} \cdot \frac{1}{f_s}. \qquad \text{Equation 6}$$

A Doppler frequency $f_D$ used in each of Equations 5 and 6 is provided by Equation 7:

$$f_D = \frac{2 \cdot f_0}{c}. \qquad \text{Equation 7}$$

The term $f_0$ represents a starting frequency of an entire frame.

The term $a$ in Equation 6 can be computed by solving Equation 8:

$$a = \frac{\dfrac{\sum_{k=0}^{K-1} \dfrac{k \cdot f_0}{f_0 + k \cdot \Delta f}}{K}}{\dfrac{K-1}{2}}. \qquad \text{Equation 8}$$

Finally, the ambiguity number $N_{ambi}$ (also referred to as the ambiguity integer) in Equation 2 represents how many times a range rate estimate has been folded with range rate coverage in that frame. The ambiguity number $N_{ambi}$ can change from one frame to the next depending on complexity of the driving environment where many objects move independently at different ranges, directions, and speeds. As some examples, the ambiguity number $N_{ambi}$ may be non-zero when ambiguity arises in situations in which a field of view of a radar system spans multiple lanes of traffic or when the radar system has a field of view encompassing a busy throughway or intersection. For targets with high relative speed, the ambiguity number $N_{ambi}$ is most often greater or less than zero, but not equal to zero. For relatively low speed targets, the ambiguity number $N_{ambi}$ is near or equal zero.

Problems with Existing Signal Models

Vehicle functions relying on radar data expect detection estimates for range R and range rate v to be free from ambiguity and to be resolved quickly, especially when many objects are independently moving in a field of view at different ranges, directions, and speed. To reduce latency in the estimation process, some existing radar systems apply an oversimplification to the signal model being used, which allows solutions to Equations 1 and 2 to be obtained more quickly. Even though it is often an incorrect assumption, the ambiguity number $N_{ambi}$ for a frame is always set to zero instead of its true value (e.g., based on a peak detection of that frame). Doing so greatly reduces complexity in solving Equations 1 and 2 enabling range R and range rate v estimates to be produced quickly, e.g., even within one frame.

However, this simplification deliberately ignores possible conditions where a detection peak for a frame may be associated with different objects appearing at similar angles within a field of view. Reducing latency to generate radar data this way, diminishes accuracy and overall usefulness when used for other radar dependent functions. Range rates v estimated from assuming the ambiguity number $N_{ambi}$ to be a constant zero in every frame are often ambiguous. When used by other radar or vehicle functions, ambiguity in radar data may induce unsafe driving and/or uncomfortable vehicle maneuvering.

Other radar processing techniques exist, which can mitigate ambiguity after a signal model incorrectly assumes it to be zero; one such post signal model processing technique is De-aliasing. These techniques generally work in conjunction with radar tracking processes; as such, the techniques are applied across multiple frames. Removing ambiguity through de-aliasing relies on an analysis of detections observed over a longer duration than just one frame. While ambiguity in the range rate estimates can be eliminated using de-aliasing, this improvement in accuracy may introduce too much latency for some radar dependent functions, especially given how often objects being detected can change position, direction, and/or speed. Many critical vehicle functions (e.g., safety, control) depend on immediate and precise reporting of detection estimates; any latency from de-aliasing or inaccuracy caused from other techniques may cause unsafe and/or uncomfortable vehicle behavior.

Overview

This document describes interleaving chirps for unambiguous range rate estimation. Instead of ignoring ambiguity, a signal model quickly and unambiguously estimates ranges and range rates of radar detections. The signal model causes a transmission of radar signals that interleave two different groups of chirps (e.g., up-chirps and down-chirps) in a sequential order, during each frame. Half of the chirps in the sequence are a group of up-chirps and the other half are a group of down-chirps. An up-chirp increases in frequency from beginning to end of that chirp; a down-chirp decreases in frequency from start to finish of that chirp. The radar system interleaves these two chirp types within the ordered sequence, for example, alternating between occupying chirps from a first group in each odd position of the sequence (e.g., positions 1, 3, 5) and occupying chirps from the other group in the remaining, even positions (e.g., 2, 4, 6), in the ordered sequence for that frame. Each frame of chirps includes this alternating sequence of up-chirps and down-chirps or down-chirps and up-chirps.

The properties of the up-chirps may be analyzed in combination with the down-chirps to compute an ambiguity term for the frame, which is uniquely selected for each identified detection peak. This unique pattern of chirps enables the signal model to consider, rather than ignore, an ambiguity term as an important often non-zero variable, for correctly estimating ranges and range rates of detections in that frame. For each group of chirps, an ambiguity variable is determined to be equal to one of a plurality of integers, which includes at least one, and more often several, integers that are greater than or less than zero. Each group of chirps may have a different peak detection, and the signal model computes a unique ambiguity variable for each group given a peak detection for that group. The ambiguity term is determined from these ambiguity variables; this way ambiguity considerations are applied appropriately for detections obtained for each group of chirps.

The ambiguity term may be modified before comparing it against a set of possible values. For instance, the ambiguity term may be truncated, rounded, or otherwise adjusted by a factor, including an offset or other modification to aid in determining a correct possible value to apply as the ambiguity term for that group of chirps. The signal model may select one of the possible values that is most similar to the computed ambiguity variable.

The ambiguity term is input to linear equations, which can be solved quickly, to unambiguously estimate range and range rate associated with detections in that frame. Ambiguity is resolved without having to analyze multiple frames. By applying more accurate assumptions to its estimations of range and range rate, an example radar system may output unambiguous radar data quickly. Ambiguity in radar data is resolved faster than if multi-frame processing techniques (e.g., de-aliasing) are used. This increase in radar accuracy and performance enables wider adoption of radar, which can promote safe driving.

Example Environment

FIG. 1 illustrates an example environment 100 for signal modeling for unambiguous range rate estimation. In the depicted environment 100, a vehicle 102 travels on a roadway. Although illustrated as a passenger truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like. The vehicle 102 relies on a perception system, including a radar system 104, for generating radar data used for detecting and avoiding other objects while the vehicle 102 drives among them in the environment 100.

The radar system 104 outputs radar data that indicative of presence, range, and/or range rate of objects (or portions of objects) detected in a field of view 106. The radar system 104 can be installed on, mounted to, or integrated with any part of the vehicle 102, such as in front, back, top, bottom, or side portions, bumpers, mirrors, light modules, rails, fenders, frame, panel, glass, including at any interior or exterior location of the vehicle 102 where object detection using radar is desired. The radar system 104 may include multiple radar devices or multiple radar systems, which can coordinate to focus, effect size, or adjust range of the field-of-view 106.

The radar data can take many forms including data cubes, detection lists, and object tracks. The radar data maybe transformed in different ways during each stage of a radar processing pipeline; some stages may execute steps to perform signal processing, detection estimating, object classifying, object tracking, and the like. The radar data can be output from the radar system 104 during any one or more of these radar processing stages. This can enable a wide range of complex radar functions (e.g., object tracker, object classifier) to be executed by radar logic (e.g., one or several processing units, processing cores, chips, programmable logic units, or other hardware) of the radar system 104; in addition, access to radar data of various forms may enable other functions (e.g., security, advanced safety, semi/autonomous control, sensor-fusion perception, occupant detection, satellite independent localization/navigation, home automation, commercial delivery, vehicle-to-vehicle, vehicle-to-everything), which execute on or off the vehicle 102, to improve their performance in performing actions based on radar information about objects (e.g., an object 108), which appear in a vicinity of the vehicle 102 as it operates in the environment 100.

As previously suggested, the radar system 104 can include a variety of radar logic, circuits, or elements, including a combination of hardware components and software components executing thereon. Some hardware and/or software components of the radar system 104 are illustrated in FIG. 1; the radar system 104 can include other functional hardware and/or software elements beyond the simple illustration shown. A computer-readable media (CRM) of the radar system 104 may include non-transitory computer-readable storage devices, which store machine-executable instructions, that when executed by hardware components (e.g., a processor), configure the radar system 104 to generate radar data including information about objects detected in the field of view 106. The radar system 104 includes a monolithic microwave integrated circuit (MMIC) 112 integrated with (e.g., on-chip) or otherwise operably coupled to at least one processor 114. A waveform generator 116, a radar processing component 118, and an antenna array 120 are also part of the radar system 104, each also being operable with the MMIC 112, the processor 114, or both.

The antenna array 120 includes a transmit-receive antenna array; as one example, this is a multiple input multiple output (MIMO) antenna array. Other simpler or more complex antenna array designs may be used to perform the described techniques for range rate estimate disambiguation; the techniques described herein are not necessarily limited only to MIMO radar systems and may be adopted for range rate estimate disambiguation by other radar systems that use other antenna designs. The antenna array 120 may include elements of a virtual array, a physical array, or a combination of physical and virtual arrays. The MIMIC 112 includes an interface to the antenna array 120, as well as an interface to one or more of the processor 114, the waveform generator 116, and the radar processing component 118.

In each frame, the MIMIC 112 is configured to transmit radar signals 110-1 via the antenna array 120 to radiate objects in the field of view 106. Responsive to these transmissions, the MIMIC 112 is configured to obtain from the antenna array 120, radar returns 110-2 corresponding to reflected versions of the radar signals 110-1 transmitted earlier in the frame. One or more waveguide elements may couple the antenna array 120 to the MIMIC 112 for improving reception of the radar returns 110-2 or transmission of the radar signals 110-1.

The MMIC 112 transforms analog signals conveying the radar returns 110-2 into a digital format, which is usable by the processor 114 and other components of the radar system 104 to perform radar based functions. An input to the MMIC 112 may receive parameters or instructions from the processor 114 that cause the MMIC 112 to apply a particular waveform when transmitting the radar signals 110-1 and/or when receiving the radar returns 110-2. An output from the MIMIC 112 may provide the processor 114 with a set of complex values representing a collection of samples taken across all chirps of the radar returns 110-2 obtained at the antenna array 120 during one frame of time.

The processor 114 may include a single processor or multiple processors. The processor may be one or more processing cores, an integrated circuit, a microchip, or other processing unit, such as a graphics processing unit (GPU). The processor 114 may be integrated in a system on chip that includes the MMIC 112 and a memory or other hardware (e.g., CRM) storing instructions that when executed by the processor, perform operations associated with the waveform generator 116 and/or the radar processing component 118.

When enabled, the waveform generator 116 determines the particular waveform that the MIMIC 112 uses for transmitting the radar signals 110-1 receiving the radar returns 110-2. The waveform generator 116 may be implemented in hardware alone (e.g., a system on chip, a programmable logic unit) or a combination of hardware and computer-readable instructions (e.g., software and/or firmware) executing thereon, for instance, by the processor 114. The waveform generator 116 may send to the processor 114 a signal waveform determined for the MMIC 112 to use during transmission of the radar signals 110-1. The MMIC 112 may perform modulation, multiplexing, or any other signal processing operation according to commands and parameters provided from the processor 114, including instructions enabling the waveform generator 116 to change how transmission of the radar signals 110-1 and/or reception of the radar returns 110-2 is handled by the MIMIC 112.

The radar processing component 118 is activated by the radar system 104 to transform each frame of radar data that is output by the MMIC 112, from the time domain, and into a frequency domain, for example, in multiple dimensions. In the frequency domain, the radar returns 110-2 may be represented in terms of a fast-time dimension (e.g., samples collected over a single chirp) and a slow-time dimension (e.g., samples collected across multiple chirps). A two-dimensional Fourier Transform applied to the radar returns 110-2 may include a Discrete Fourier Transform (DFT) or a Fast Fourier Transform (FFT).

Energy associated with each of the radar returns 110-2 becomes apparent after applying this transformation, which allows for identifying detections 122. Some of the two-dimensional data may be indicate false detections or noise; it may be filtered, thereby reducing complexity or the amount of radar data ultimately processed. Based on the detections 122, which are a digitized two-dimensional representation of the radar returns 110-2 obtained from the MMIC 112, the radar processing component 118 may configure the processor 114 to filter the detections 122 by applying thresholding and/or non-maximal suppression of the energy attributed to the detections 122, for example, by searching in a Range-Doppler plane. Performing energy peak finding among the digitized two-dimensional radar data can separate the detections 122, which are to real objects, more easily from false detections and noise. For example, a peak may be found within the two-dimensional representation of the digitized radar returns 110-2 based on locations of the detections 122 in the fast-time dimension (e.g., samples collected over a single chirp) and the slow-time dimension (e.g., samples collected over multiple chirps). Low energy returns may be ignored (e.g., discarded as noise); groups of high energy returns can indicate the detections 122 attributed to radar reflective portions of the objects during one frame.

After being filtered to reduce complexity in further radar data processing (e.g., estimating range and range rates), the radar processing component 118 may utilize the found detection peaks to generate a list of the detections 122, which are considered valid for analyzing and reporting in an output from the radar system 104. For instance, one or more of the detections 122 can indicate a range and radial range rate attributed to the radar returns 110-2 (or scatters) that are effective at reflecting from the object 108 in the environment 100. Although the detections 122 in the list may have errors in precise position (e.g., azimuth angle), high-quality estimates of range and radial range rates are derivable to an accurate degree.

Analyzing properties of the detections 122 over multiple frames enables other complex radar functions, such as object classification, object tracking. For instance, a radar tracker may produce object data derived from the detections 122, e.g., from grouping and analyzing the estimates of the detections 122 using detection-based object recognition techniques. Ensuring that properties, including the range and range rate estimates, for the detections 122 are accurate and computed quickly (e.g., within a single frame) can greatly improve performance of other vehicle functions that depend on their efficiency.

The radar processing component 118 can execute a signal model to estimate a range and range rate for each of the detections 122 deemed to be high energy. The signal model dictates transmission of the radar signals 110-1, analysis of the radar returns 110-2, and a mathematical solution for estimating properties of the detections 122. The signal model of the radar processing component 118 defines a set of linear equations to apply to the detections 122 for estimating ranges and range rates associated with any of the detections 122 that correspond to the found peaks. Using frequencies of peaks of the detections 122 in each of the respective frequency domains, solutions to the complex set of equations can be solved.

Example System

Figure 2:
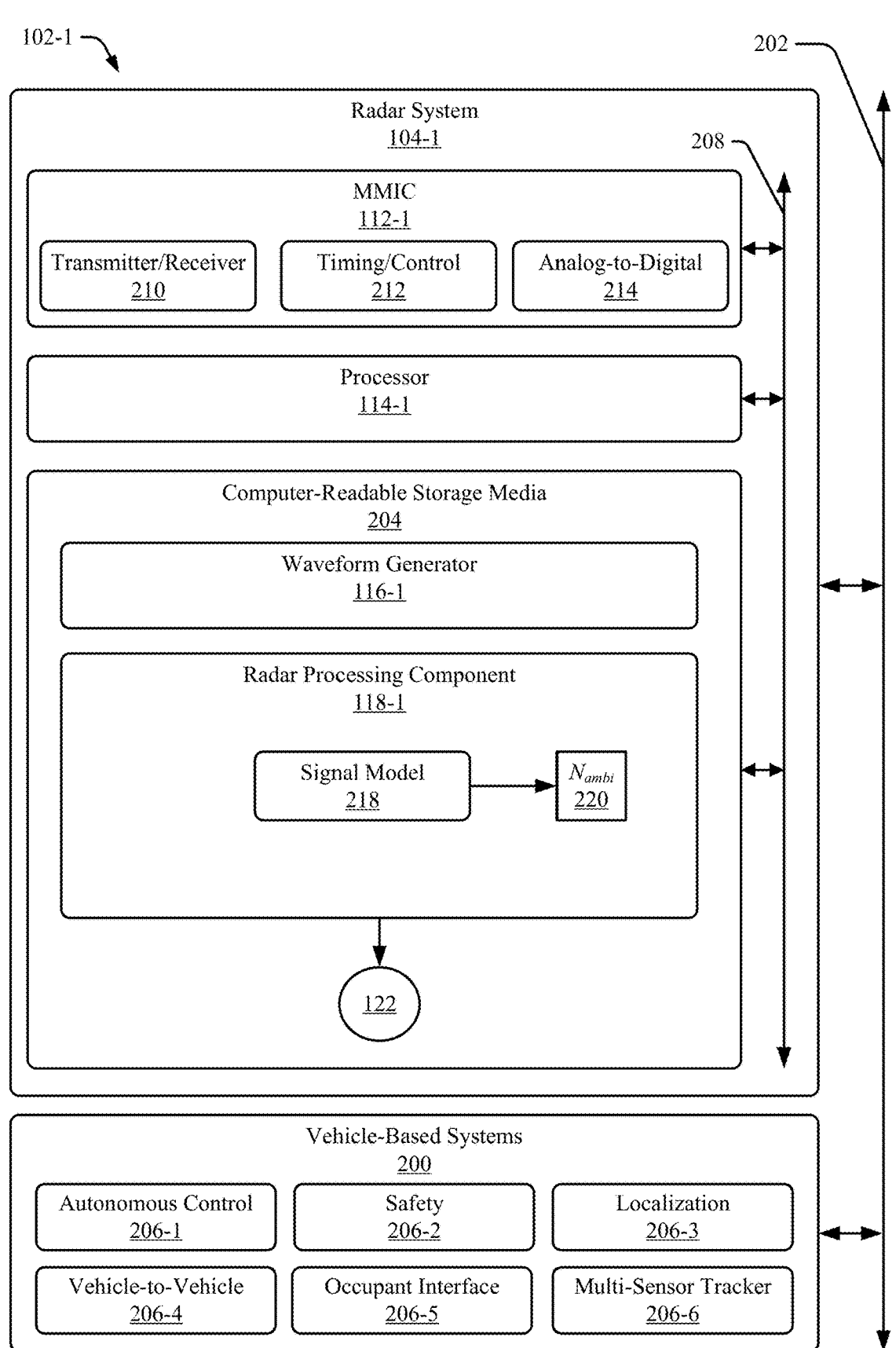
FIG. 2 illustrates an example system configured to model signals for unambiguous range rate estimation.

FIG. 2 illustrates an example system configured to model signals for unambiguous range rate estimation. The system in FIG. 2 represents part of the vehicle 102, and in this context, the system is referred to as a vehicle 102-1. Many other parts of the vehicle 102-1 are omitted for ease of explanation and clarity in the drawings; these other components of the vehicle 102-1, which rely on radar data, can improve performance of their own functions, by receiving unambiguous range rate estimates determined from interleaving chirps, in according to the described techniques.

Included in the vehicle 102-1 is a radar system 104-1, which is an example of the radar system 104 shown in greater detail. The vehicle 102-1 includes vehicle-based systems 200 that are operatively and/or communicatively coupled to the radar system 104-1 via link 202, which may be one or more wired and/or wireless links including vehicle-based network communications for interconnecting the components of the vehicle 102-1. In some examples, the link 202 is a vehicle communication bus.

The vehicle-based systems 200 use radar data provided on the link 202 by the radar system 104-1 to perform a particular function. Examples of the vehicle-based systems 200 include systems for autonomous control 206-1, safety 206-2, localization 206-3, vehicle-to-vehicle 206-4 communication, occupant interface 206-5, and multi-sensor tracker 206-6. Other examples of the vehicle-based systems 200 are conceivable as, including vehicle subsystems (e.g., components, circuits) thereof. For example, the detections 122 can include information about movement of an object in the field of view, such as a range and range rate of the object 108 to enable the vehicle-based systems 200 to control the vehicle 102-1 to perform emergency braking, perform a lane change, or adjust a vehicle direction and/or speed.

The radar data that is output to the vehicle-based systems 200 on the link 202 includes information about objects, or portions thereof, which are detected in the field-of-view 106. The radar data can include the detections 122, or tracks to objects derived from the detections 122; the detections 122 and/or the tracks may be provided to the vehicle-based systems 200 to enable other vehicle functions. Upon receipt by the vehicle-based systems 200, the detections 122 or other radar data can enable the vehicle 102-1 to drive safely by avoiding the object 108. For example, an object detection to a vehicle in an adjacent lane to the vehicle 102-1 may be usable for blind spot monitoring.

As additional examples, the autonomous control 206-1 provided by the vehicle-based systems 200 can use the radar data received via the link 202 to autonomously or semi-autonomously control the vehicle 102-1 and safely drive on a road. The vehicle-based systems 200 may perform other functions performed in response to the detections 122 or tracks, which are not necessarily for vehicle control. For instance, the detections 122 can be output to the occupant interface 206-5 to allow the operator or controller to act and avoid the objects. The detections 122 may be provided to other vehicles using the vehicle-to-vehicle 206-4 communication, to allow operators or controllers of the other vehicles to also avoid the objects being tracked or have confidence that the vehicle 102-1 is aware of the presence of the other vehicles. Radar data enables improved situational awareness, which enables the vehicle 102-1 to drive in a safer manner to avoid the object 108 and other objects in the environment 100.

The radar system 104-1 includes a MMIC 112-1, as an example of the MMIC 112. The MMIC 112-1 includes transmitter/receiver elements 210, timing/control elements 212, and analog-to-digital converters 214. For simplicity in the Drawings, omitted from FIG. 2 is the antenna array 120, which is also part of the radar system 104-1 and operatively coupled to the transmitter/receiver elements 210.

The transmitter/receiver elements 210 are configured to transmit electromagnetic (EM) signals as radar signals (e.g., the radar signals 110-1) and to receive reflected versions of the EM signals (e.g., the radar returns 110-2). In a MIMO example, the transmitter/receiver elements 210 enable reception of the radar returns with greater resolution than, for example, multistate radar. The transmitter/receiver element 210 includes one or more components for emitting, and one or more components for detecting, the EM signals. The transmitter/receiver elements 210 enable transmission of the radar signals that radiate the field of view 106, and manage reception of the radar returns, many of which correspond to object reflections of the transmitted radar signals. The transmitter/receiver element 210 can be configured as a transceiver implemented as a single component (e.g., chip) to perform both transmission and reception. Alternatively, the transmitter/receiver element 210 can be implemented as a separate transmitter and a separate receiver.

The timing/control elements 212 perform operations that adjust characteristics of the radar signals (e.g., frequency, gain, phase, period) being transmitted, or operations to capture the radar returns being reflected, in a way that is effective for radar processing. For example, in accordance with existing MIMO techniques, the timing/control elements 212 cause the transmitter/receiver elements 210 to adjust a size, a shape, antenna pattern, or other characteristic of the radar signals 110-1 to cause the radar returns 110-2 to capture high-resolution information about the environment 100.

The analogue-to-digital converters 214 convert the radar returns obtained from the transmitter/receiver elements 210 into a digital form that can be used for generating detections 122 and other radar processing. The MIMIC 112-1 samples the signal at an appropriate sampling rate, for example, at least the Nyquist frequency. The MMIC 112-1 outputs the digitized radar returns over a link 208, which represents an internal communication link between components of the radar system 104-1. The link 208 may be wired or wireless and enables internal representations of radar data to be exchanged within the radar system 104-1 before appearing as the detections 122 and/or tracks, which are output on the link 202.

Operatively coupled to the MMIC 112-1 and the link 208, the radar system 104-1 also includes at least one processor 114-1, which is an example of the processor 114. Some examples of the processor 114-1 include, a controller, a control circuit, a microprocessor, a chip, a system, a system-on-chip (SoC), a device, a processing unit, a digital signal processing unit, a graphics processing unit, and a central processing unit. The processor 114-1 can be any component configured to process frames of digitized radar returns obtained from the MIMIC 112-1 to convey objects in the field of view based on information appearing in the detections 122. The processor 114-1 may include multiple processors, one or more cores, embedded memory storing software or firmware, a cache or any other computer element that enables the processor 114-1 to execute machine-readable instructions for generating the detections 122.

The machine-readable instructions that are executed by the processor 114-1 can be stored by a computer-readable media (CRM 204) of the radar system 104-1. The CRM 204 may also be used to store data managed by the processor 114-1 during execution of the instructions. In some examples, the CRM 204 and the processor 114-1 are a single component, such as an SoC including the CRM 204 configured as a dedicated memory for the processor 114-1. In some examples, access to the CRM 204 is shared by other components of the radar system 104-1 (e.g., the MMIC 112-1) that are connected to the CRM 204, e.g., via the link 208. The processor 114-1 obtains instructions from the CRM 204 and execution of the instructions configure the processor 114-1 to perform radar operations. Example radar operations include signal processing, which result in communication of the detections 122 to the vehicle-based systems 200 and other components of the vehicle 102-1 over the link 202.

In this example, the CRM 204 may include instructions for configuring the processor 114-1 to generate the detections 122 and resolve ambiguity in estimates of range and range rate associated with the detections 122. For example, the CRM 204 includes instructions for executing the radar processing component 118-1, which is an example of the radar processing component 118. Also included in the CRM 204 are instruction sets, which when executed by the processor 114-1, implement a waveform generator 116-1, which is an example of the waveform generator 116.

When executed by the processor 114-1, the waveform generator 116-1 generates or commands the MIMIC 112-1 to generate radar signals with a waveform based on defined parameters. In aspects, the waveform generator 116-1 may provide instructions for causing the waveform to be generated from the MIMIC 112-1, where the waveform may undergo any number of signal operations, for example, modulation, multiplexing, filtering, and the like. The waveform may then be output by the MMIC 112-1 to a transmit antenna array that transmits the radar signals in the object field of view.

The transmitted radar signals may include the waveform generated using the waveform generator 116-1, and as a result, the radar returns reflected off of objects in the field of view may be processed to include range and range rate estimates that are free from ambiguity. It should be understood that, though illustrated as the processor 114-1 executing the waveform generator 116-1, the waveform generator 116-1 and processor 114-1 may be implemented together, for example, as a SoC. Further, the waveform generator 116-1 may include any other combination of fixed logical circuitry and be implemented, in whole or in part, through hardware, or a combination of hardware and software or firmware.

When executed by the processor 114-1, the radar processing component 118-1 determines a two-dimensional representation in the frequency domain of the digitized radar returns output by the MIMIC 112-1. For example, the radar processing component 118-1 may use a Fourier Transform to transform the digitized radar returns output from the MIMIC 112-1 in the time domain to the two-dimensional representation of the radar returns in the frequency domain. The two-dimensional representation may include a fast-time dimension corresponding to samples collected over a single chirp and a slow-time dimension corresponding to samples collected over multiple chirps.

Once the two-dimensional representation of the radar returns in the frequency domain is determined, the radar processing component 118-1 may operate on a peak of the two-dimensional representation, for example, a peak found through peak searching. In doing so, the radar processing component 118-1 may utilize the frequency of the found peak in the fast-time dimension and the frequency of the found peak in the slow-time dimension to solve a two-dimensional system of equations with respect to the range and range rate associated with the found peak. The radar processing component 118-1 may output the detections 122, including the range and the range rate. The vehicle-based systems 200 may receive the detections 122 directly over the link 202 to assist in performing a function of the vehicle 102-1.

To generate the detections 122, including unambiguous range and range rate estimates, a signal model 218 is adopted by the radar system 104-1, which in accordance with the described techniques, prevents ambiguity to improve accuracy of the detections 122.

Example Signal Model

The signal model 218 is an example of a new signal model mentioned above, which considers, rather than ignores, possible ambiguity in its detection based range rate estimations. The signal model 218 interfaces with the waveform generator 116-1 to configure the MIMIC 112 to transmit the radar signals 110-1 as an ordered sequence of chirps spanning each frame.

The signal model 218 commands the waveform generator 116-1 to include an interleaving or alternating pattern of chirps from two different groups in each frame's ordered sequence of chirps. One group of chirps includes up-chirps, and the other group includes down-chirps. A frame can start with a down-chirp or start with an up-chirp. There may be cases when more than two groups of chirps are used, although for ease of description, two groups, including up-chirps and down-chirps, are available chirp types for the ordered sequence in each frame.

The signal model 218 divides the ordered sequence of chirps into odd and even positional groups. The waveform generator 116-1 receives instructions from the signal model 218 to generate the radar signals 110-1 with one type of chirp to be transmitted at each odd position (e.g., 1, 3, 5) of the sequence, and the other type of chirp to be transmitted at each even position (e.g., 2, 4, 6) of the sequence. This causes each frame to include many consecutive pairs of up and down-chirps. Up-chirps are interleaved with down-chirps such that no two consecutive chirps are of the same type. Detailed aspects of the radar signals 110-1 that may be generated from execution of the signal model 218 are further evident from the below descriptions of FIGS. 3 and 4.

By causing the waveform generator 116-1 to interleave up-chirps with down-chirps during each frame, the signal model 218 can consider and eliminate ambiguity in estimating range and range rate for each chirp, which elicits a radar response during that frame. Unlike a typical signal model that incorrectly assumes an ambiguity term $N_{ambi}$ to always be zero, the signal model 218 dynamically computes an ambiguity term $N_{ambi}$ 220 for each frame, including a corresponding ambiguity term for each group of chirps.

Chirps from an up-chirp group are assigned a corresponding ambiguity term $N_{ambi_{Up\ Chirp}}$, which can also be referred to as either $N_{ambi_{Even}}$ or $N_{ambi_{Odd}}$. Down-chirps in the other group are assigned a corresponding ambiguity term $N_{ambi_{Down\ Chirp}}$, which can also be referred based on its positional grouping rather than chirp characteristic, such as $N_{ambi_{Even}}$ or $N_{ambi_{Odd}}$. The ambiguity term is not necessarily the same among the different groups of chirps of each frame. Each group of chirps can have a different ambiguity term. More often than not, the ambiguity term is greater than or less than, but not equal to, zero. A corresponding ambiguity term for each group of chirps is computed independently using initial range and Doppler measurements of (e.g., peak) detections associated with that group of chirps. The signal model 218 applies a unique mathematical solution to estimate each of the ambiguity terms $N_{ambi_{Up\ Chirp}}$ and $N_{ambi_{Down\ Chirp}}$ by analyzing peak detections in that group for an entire frame of chirps.

Equation 9 represents a set of four linear equations, which the signal model 218 applies to determine each of these four unknowns:

$$\begin{bmatrix} -f_{R_{1_{Odd}}} & -f_{D_{1_{Odd}}} & 0 & 0 \\ -f_{R_{2_{Odd}}} & -f_{D_{2_{Odd}}} & -\dfrac{1}{PRP_{Odd}} & 0 \\ -f_{R_{1_{Even}}} & -f_{D_{1_{Even}}} & -f_{R_{1_{Even}}} \cdot \Delta t & 0 & 0 \\ -f_{R_{2_{Even}}} & -f_{D_{2_{Even}}} & -f_{R_{2_{Even}}} \cdot \Delta t & 0 & -\dfrac{1}{PRP_{Even}} \end{bmatrix} \cdot \quad \text{Equation 9}$$

$$\begin{bmatrix} R \\ v \\ N_{ambi_{Odd}} \\ N_{ambi_{Even}} \end{bmatrix} = \begin{bmatrix} p^*_{Odd} \cdot \dfrac{f_s}{M} \\ q^*_{Odd} \cdot \dfrac{\frac{1}{PRP_{Odd}}}{K} \\ p^*_{Even} \cdot \dfrac{f_s}{M} \\ q^*_{Even} \cdot \dfrac{\frac{1}{PRP_{Even}}}{K} \end{bmatrix}.$$

In Equation 9, each group of chirps (e.g., odd chirps, even chirps) are analyzed as a whole. The signal model 218 operates according to parameters (which may be reprogrammable) including a parameter (M) for a number of samples per chirp, a parameter (K) for a number of chirps per frame, a parameter ($f_s$) for a sampling rate, a parameter ($PRP_{Odd}$) for a time delay between first and second odd chirps within the frame, and a parameter ($PRP_{Even}$) for a time delay between first and second even chirps within the frame. In addition, a parameter ($p^*_{Odd}$) is a fractional bin estimate for the fast-time dimension for a first group of chirps (e.g., all odd chirps), and a parameter ($p^*_{Even}$) is a fractional bin estimate for the fast-time dimension for the other group of chirps (e.g., all even chirps). Similarly, a parameter ($q^*_{Odd}$) is a fractional bin estimate for the slow-time dimension of for the first group of chirps, and a parameter ($q^*_{Even}$) is a fractional bin estimate for the slow-time dimension of second group of chirps. A further parameter includes a time delay ($\Delta t$) between a first chirp (e.g., odd) and a second chirp (e.g., even) of the frame to compensate for target movement over the consecutive chirps.

During radar processing of radar returns initial range and Doppler measurements are determined; the odd chirps have a ranging frequency $$f_{R_{1_{Odd}}}$$

in the fast-time dimension, and a ranging frequency $$f_{R_{2_{Odd}}}$$

in the slow-time dimension. The odd chirps also have a Doppler frequency $$f_{D_{1_{Odd}}}$$

in the fast-time dimension, and a Doppler frequency $$f_{D_{2_{Odd}}}$$

in the slow-time dimension. The even chirps similarly have a ranging frequency $$f_{R_{1_{Even}}}$$

in the fast-time dimension, and a ranging frequency $$f_{R_{2_{Even}}}$$

in the slow-time dimension, a Doppler frequency $$f_{D_{1_{Even}}}$$

in the fast-time dimension, and a Doppler frequency $$f_{D_{2_{Even}}}$$

in the slow-time dimension.

Figure 3:
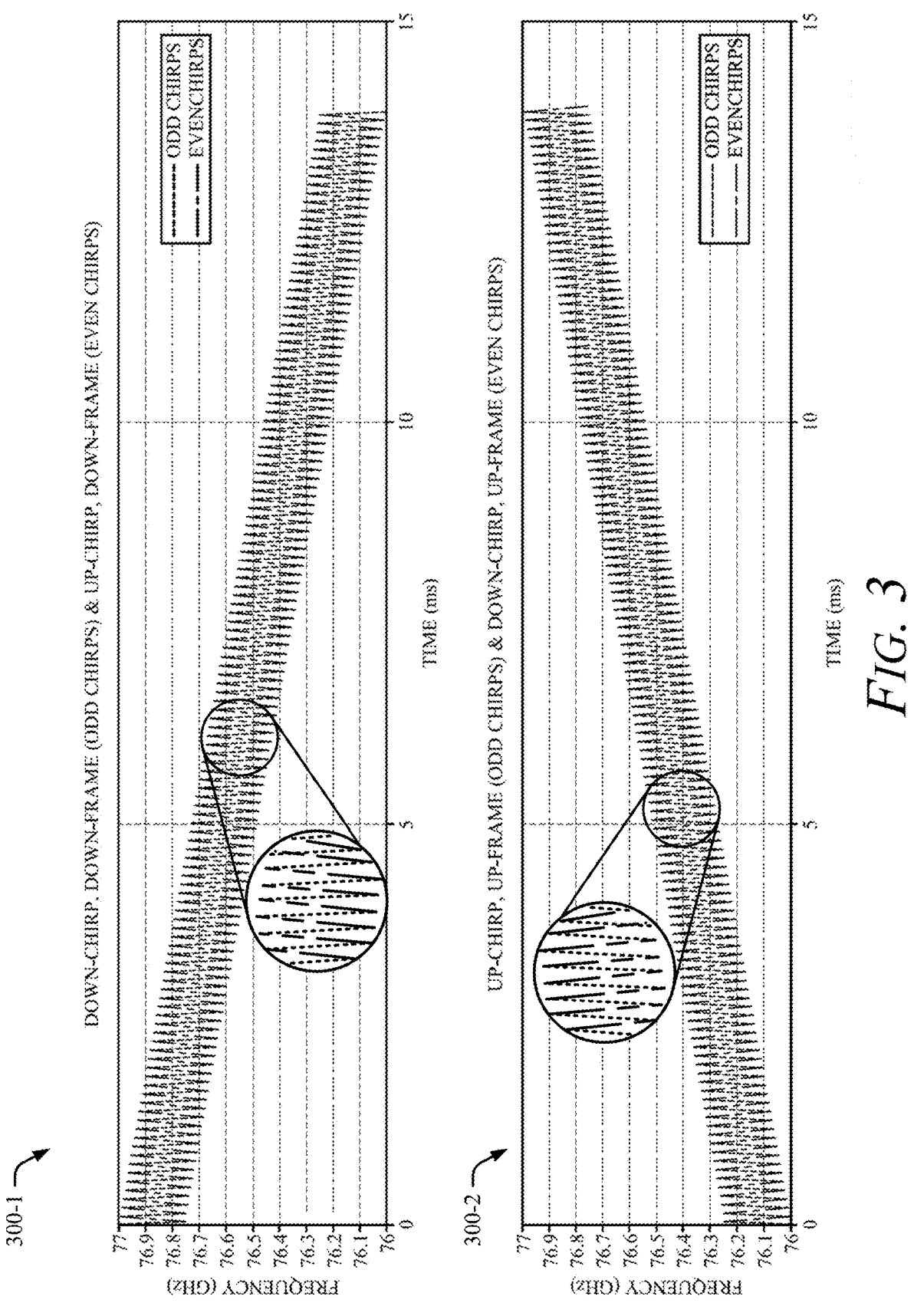
FIGS. 3 and 4 illustrate graphs of example signal waveforms used in signal modeling for enabling unambiguous range rate estimation.
Figure 4:
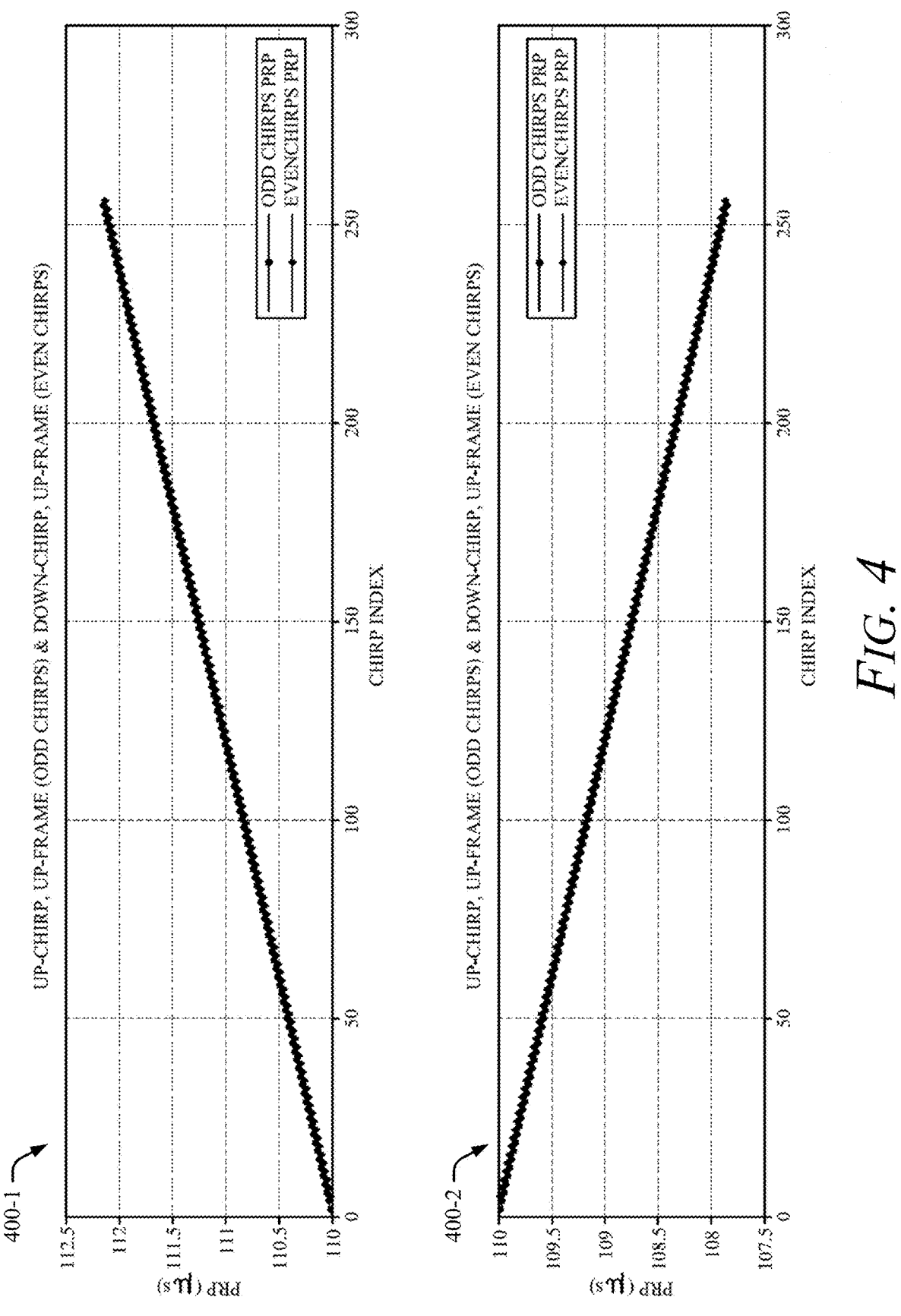

With the ambiguity term $N_{ambi}$ 220 computed for each group of chirps of the frame, range R and range rate v for detections from each group of chirps can be estimated unambiguously. For example, by applying Equations 1 and 2, range R and range rate v for detections from each group of chirps can be computed. However, instead of applying a zero constant for ambiguity, a correct ambiguity term $N_{ambi}$ 220 (e.g., $N_{ambi_{Odd}}$ and $N_{ambi_{Even}}$) is considered. Solving Equations 1 and 2 using the correct ambiguity term $N_{ambi}$ 220 for each chirp in a frame enables the signal model 218 to quickly calculate detections based range rates v that are unambiguous. FIG. 5 describes further details how in solving Equation 9, the signal model 218 configures the radar system 104-1 to estimate a range rate v that is unambiguous.
Example Waveform FIGS. 3 and 4 illustrate graphs of example signal waveforms used in signal modeling for enabling unambiguous range rate estimation. The example frames shown in FIGS. 3 and 4 are just two examples, other waveforms may be used depending on specific applications and radar techniques being applied.

Each of graphs 300-1 and 300-2 in FIG. 3 represent a different example waveform (showing signal frequency over time) adopted by the signal model 218 during each frame. The signal model 218 is configured to interleave up-chirps with down-chirps in either case.

Graph 400-1 in FIG. 4 represents a corresponding PRP response for the waveform depicted in the graph 300-1 at each chirp index (e.g., each position in an ordered sequence of chirps). Graph 400-2 in FIG. 4 represents a corresponding PRP response for the waveform depicted in the graph 300-2 at each chirp index (e.g., each position in an ordered sequence of chirps).

The graphs 300-1 and 400-1 show an example down frame. In the down frame, the frequency range of the ordered sequence of chirps shifts to lower frequencies over the course of the frame. The down frame include an ordered sequence of chirps. The first chirp is a down-chirp, and each other odd position of the sequence also includes a down-chirp. The second chirp in the ordered sequence is an up-chirp instead of a down-chirp. Each other even position of the sequence includes an up-chirp, as well.

The graphs 300-2 and 400-2 provide an example up frame. In contrast to a down frame, the frequency range of the ordered sequence of chirps in an up frame shifts to higher frequencies over the duration of the frame. The up frame also includes an ordered sequence of chirps. However, its first chirp position, and each other odd position of the sequence, includes an up-chirp. Its second chirp position, and each other even position of the sequence, includes a down-chirp instead of an up-chirp.
Example Process FIG. 5 illustrates an example process 500 for signal modeling for unambiguous range rate estimation. The operations (or steps) 502 through 510 are performed but are not necessarily limited to the order or combinations in which the operations are shown herein. Further, any of one or more of the operations may be repeated, combined, or reorganized to provide other operations.

For ease of description, the process 500 is described with respect to the elements of the preceding FIGS. The process 500 may be performed by the radar system 104, the radar system 104-1, and other example radar systems that utilize a signal model, such as the signal model 218, to compute the ambiguity term $N_{ambi}$ 220 and enable a more precise range rate v estimate that is free from ambiguity. For ease of description, the process 500 is described in context of the radar processing component 118-1, including the signal model 218, being executed on the processor 114-1.

Consider an example where the vehicle 102 is driving and the radar system 104-1, which is part of the vehicle system 102-1, provides radar data as perception information to other parts of the vehicle 102. This radar data may aid the radar system 104-1 or other systems of the vehicle 102 to perform operations related to driving (e.g., autonomous control, semi-autonomous control, advanced safety emergency stop).

At 502, radar signals for a frame are transmitted by interleaving two different groups of chirps into an ordered sequence of chirps such that each consecutive pair of chirps includes an initial chirp from one of the two groups and a subsequent chirp from the other of the two groups. For example, a frame of the radar signals 110-1 is transmitted by the radar system 104-1 into the environment 100. The signal model 218 adopted by the radar system 104-1 configures the MIMIC 112-1 and/or the waveform generator 116-1 to cause transmission of the radar signals 110-1, which then take a form similar to the waveforms shown by the graphs 300-1 and 300-2. During each frame, the radar signals 110-1 include an ordered sequence of chirps, which two different groups of chirps being transmitted in an alternating manner. For example, one of the two groups is a group of odd chirps, which includes up-chirps that increase in frequency during transmission. The other group is a group of even chirps, which includes down-chirps that decrease in frequency during transmission. Each consecutive pair of chirps in the ordered sequence includes one chirp from each of the two groups.

The group of odd chirps can include down-chirps and the group of even chirps can include up-chirps. In other examples, the group of odd chirps includes up-chirps and the group of even chirps includes down-chirps. In reference to step 502, the initial chirp in each consecutive pair of chirps can be a chirp from the group of up-chirps, and the subsequent chirp in each consecutive pair of chirps can be a chirp from the group of down-chirps; this is shown in the graph 300-2. In other examples, the initial chirp is a chirp from the group of down-chirps, and the subsequent chirp is from the group of up-chirps, as shown in the graph 300-1.

The signal model 218 operates according to parameters (which may be reprogrammable) including a parameter (M) for a number of samples per chirp, a parameter (K) for a number of chirps per frame, a parameter ($f_s$) for a sampling rate, a parameter ($PRP_{Odd}$) for a time delay between first and second odd chirps within the frame, and a parameter ($PRP_{Even}$) for a time delay between first and second even chirps within the frame. A further parameter includes a time delay ($\Delta t$) between a first chirp (e.g., odd) and a second chirp (e.g., even) of the frame to compensate for target movement over two consecutive chirps in the sequence.

At 504, based on radar returns obtained in response to transmission of the radar signals, initial range and Doppler measurements for each of the two groups are identified. For example, the radar system 104-1 transforms digitized radar returns 110-2 output from the MMIC 112-1 in the time domain, i.e., into their two-dimensional representation in a frequency domain. The two-dimensional representation may include a fast-time dimension corresponding to samples collected over a single chirp and a slow-time dimension corresponding to samples collected over multiple chirps. Once the two-dimensional representation of the radar returns 110-2 in the frequency domain is determined, initial range and Doppler estimates associated with each group of chirps can be inferred.

Each of the two groups of chirps is associated with initial range and Doppler measurements derived from sampling the radar returns 110-2 attributed to that group of chirps. For example, the radar processing component 118-1 can generate initial range and Doppler measurements identifiable from the radar returns 110-2, independently for each of the two groups of chirps. The initial range and Doppler measurements for an odd group of chirps may have a ranging frequency $$f_{R_{1_{Odd}}}$$

in the fast-time dimension, a ranging frequency $$f_{R_{2_{Odd}}}$$

in the slow-time dimension, a Doppler frequency $$f_{D_{1_{Odd}}}$$

in the fast-time dimension, and a Doppler frequency $$f_{D_{2_{Odd}}}$$

in the slow-time dimension. An even group of chirps, similarly, may have initial range and Doppler measurements that include a ranging frequency $$f_{R_{1_{Even}}}$$

in the fast-time dimension, and a ranging frequency $$f_{R_{2_{Even}}}$$

in the slow-time dimension, a Doppler frequency $$f_{D_{1_{Even}}}$$

in the fast-time dimension, and a Doppler frequency $$f_{D_{2_{Even}}}$$

in the slow-time dimension. The initial range and Doppler measurements for the odd group of chirps in the frame can also include a parameter ($p^*_{Odd}$), which is a fractional bin estimate for the fast-time dimension of the odd group of chirps in the frame. The initial range and Doppler measurements for the even group of chirps can include a parameter ($p^*_{Even}$), which is a fractional bin estimate for the fast-time dimension of the even group of chirps in the frame. A parameter ($q^*_{Odd}$), which is a fractional bin estimate for the slow-time dimension of the odd group of chirps in the frame, and a parameter ($q^*_{Even}$), which is a fractional bin estimate for the slow-time dimension of the even group of chirps in the frame, may be included in the initial range and Doppler measurements identified for the frame.

At 506, an ambiguity term for each of the two groups is selected from among a plurality of ambiguity terms used for unambiguously estimating range rates for detections. The ambiguity term for each of the two groups is selected independently based on initial range and Doppler measurements of the detections identified for that group. The plurality of ambiguity terms can include zero and non-zero terms. They may include at least one integer greater than or less than zero. In some case, one or more of ambiguity terms is selected to be zero. That is, unlike other radar systems that ignore possible ambiguity, the ambiguity terms from either odd or even chirps can be non-zero.

To generate range and range rate estimates for the detections 122 in the frame, without ambiguity, the signal model 218 is configured to compute the ambiguity term 220 for $N_{ambi}$ for each frame, rather than ignore it. For each frame of chirps, the signal model 218 generates solutions to Equation 9 for selecting the ambiguity term $N_{ambi}$ 220 for that specific frame.

The signal model 218 configures the radar system 104-1 to produce solutions to Equation 9 to compute, based on the A second ambiguity variable for the second group of chirps (e.g., the even chirps) is computed as well, which can be used to select a second ambiguity term $N_{ambiEven}$ from among the plurality of ambiguity terms that is nearest in value to one of the available ambiguity terms.

In rearranging Equation 9, Equation 10 can be used to solve the ambiguity variable for each group of chirps:

$$
\begin{bmatrix}
\hat{R} \\
\hat{v} \\
\hat{N}_{ambi_{Up-Chirp}} \\
\hat{N}_{ambi_{Down-Chirp}}
\end{bmatrix}
=
$$

Equation 10

$$
\begin{bmatrix}
-f_{R_{1_{Up-Chirp}}} & -f_{D_{1_{Up-Chirp}}} & 0 & 0 \\
-f_{R_{2_{Up-Chirp}}} & -f_{D_{2_{Up-Chirp}}} & -\dfrac{1}{PRP_{Up-Chirp}} & 0 \\
-f_{R_{1_{Down-Chirp}}} & -f_{D_{1_{Down-Chirp}}} & 0 & 0 \\
-f_{R_{2_{Down-Chirp}}} & -f_{D_{2_{Down-Chirp}}} & 0 & -\dfrac{(1)}{(PRP_{Down-Chirp})}
\end{bmatrix}^{-1}
$$

$$
\begin{bmatrix}
\overset{*}{p}_{Up-Chirp} \cdot \dfrac{f_s}{M} \\
\overset{*}{q}_{Up-Chirp} \cdot \dfrac{\frac{1}{PRP_{Up-Chirp}}}{K} \\
\overset{*}{p}_{Down-Chirp} \cdot \dfrac{f_s}{M} \\
\overset{*}{q}_{Down-Chirp} \cdot \dfrac{\frac{1}{PRP_{Down-Chirp}}}{K}
\end{bmatrix}
.
$$

initial range and Doppler measurements of the detections 122, an ambiguity variable for each group of chirps. The ambiguity variable for each group can be used to select an ambiguity term from among a plurality of ambiguity terms, to apply to estimating range rates for detections inferred from that group of chirps in the frame.

For example, the ambiguity term $N_{ambi}$ 220 may include an ambiguity term for the odd chirps and another ambiguity term for the even chirps of the frame. An ambiguity variable is computed for each group of chirps. The ambiguity term for a group of chirps can be selected as the ambiguity term from the plurality that is nearest in value to the ambiguity variable computed for that group. In some examples, the ambiguity variable of a group may be rounded up or rounded down to a nearest integer value corresponding to the ambiguity term to apply to that group. In this way, the signal model 218 configures the radar system to 104-1 correctly apply the ambiguity term $N_{ambi}$ 220 to each group of chirps.

The radar system 104-1 may determine a first ambiguity variable for the first group of chirps (e.g., the odd chirps). The first ambiguity variable can be used to select a first ambiguity term $N_{ambi_{Odd}}$ from among the plurality of ambiguity terms that is nearest in value to the first ambiguity variable. For example, the first ambiguity variable may be computed as a decimal value and rounded to the nearest positive or negative integer (e.g., zero, one, two, negative one, negative two) to derive the first ambiguity term $N_{ambi_{Odd}}$.

Solving Equation 10 enables selection of the correct ambiguity term $N_{ambi}$ 220 for each of the two groups of chirps. Based in part on the parameters and the initial range and Doppler measurements obtained from the radar returns 110-2 as described above, the signal model 218 configures the radar system 104-1 to solve Equation 10 to set the correct ambiguity term $N_{ambi}$ 220 for each group of chirps in the frame to be either one of the two unknowns $\hat{N}_{ambi_{Up-Chirp}}$ and $\hat{N}_{ambi_{Down-Chirp}}$.

At 508, the ambiguity term selected for the two groups is used to estimate an unambiguous range rate for detections associated with either of the two groups. For example, rather than ignoring its contribution, ambiguity range rate estimates is prevented by inputting the correct ambiguity term $N_{ambi}$ 220 into the Equation 10 to solve for the range R and the range rate v of the detections 122 for that group. This way estimates of range R and the range rate v are unambiguously determined.

As mentioned, the odd chirps can be up-chirps or down-chirps. The even chirps are down-chirps if the odd chirps are the up-chirps, or vice versa. Equation 11 shows how from Equation 10, a solution for unambiguously estimating range R and range rate v of the up-chirps. Equation 12 shows a solution for unambiguously estimating range R and range rate v of the down-chirps.

$$
\begin{bmatrix}
R \\
v
\end{bmatrix}
=
\begin{bmatrix}
-f_{R_{1_{Up-Chirp}}} & -f_{D_{1_{Up-Chirp}}} \\
-f_{R_{2_{Up-Chirp}}} & -f_{D_{2_{Up-Chirp}}}
\end{bmatrix}^{-1}
.
$$

Equation 11

US 12,656,483 B2

-continued $$
\left[ q^*_{Up\text{-}Chirp} \cdot \dfrac{ p^*_{Up\text{-}Chirp} \cdot \frac{f_s}{M} }{ \dfrac{\overline{PRP_{Up\text{-}Chirp}}}{K} } + \dfrac{ \text{round}(\hat{N}_{ambi_{Up\text{-}Chirp}}) }{ PRP_{Up\text{-}Chirp} } \right] \cdot
$$

$$
\begin{bmatrix} R \\ v \end{bmatrix} = \begin{bmatrix} -f_{R_{1_{Down\text{-}Chirp}}} & -f_{D_{1_{Down\text{-}Chirp}}} \\ -f_{R_{2_{Down\text{-}Chirp}}} & -f_{D_{2_{Down\text{-}Chirp}}} \end{bmatrix}^{-1} \cdot
$$

Equation 12

$$
\left[ q^*_{Down\text{-}Chirp} \cdot \dfrac{ p^*_{Down\text{-}Chirp} \cdot \frac{f_s}{M} }{ \dfrac{\overline{PRP_{Down\text{-}Chirp}}}{K} } + \dfrac{ \text{round}(\hat{N}_{ambi_{Down\text{-}Chirp}}) }{ PRP_{Down\text{-}Chirp} } \right] \cdot
$$

In each of Equations 11 and 12, the ambiguity terms $\hat{N}_{ambi_{Down\text{-}Chirp}}$ correspond to the ambiguity variables derived from solving Equation 10. To select the correct ambiguity terms $\hat{N}_{ambi_{Up\text{-}Chirp}}$ and $\hat{N}_{ambi_{Down\text{-}Chirp}}$, each ambiguity variable is rounded to a nearest integer. Then in solving Equations 11 and 12, the range R and range rate v for the detections 122 from each group of chirps, whether up-chirps or down-chirps, may be estimated without ambiguity.

At 510, the ambiguity term selected for the two groups is used to estimate an unambiguous range rate for detections associated with either of the two groups. For example, the range rate estimates for the detections 122 inferred by the two groups of chirps are output from the radar signal processing component 118-1. The radar processing component 118-1 may output the detections 122, including the range and the range rate, such that the vehicle-based systems 200 may receive the detections 122 to assist in performing a function of the vehicle 102-1.

This accurate and unambiguous radar data can be used by these vehicle systems or other components (e.g., tracker) of the radar system 104-1 to improve performance for vehicle functions that depend on radar data. Therefore, range rate v can be calculated using this unambiguous technique, which is unambiguous due to a correct ambiguity term $N_{ambi}$ being used for each group of chirps.

Further Details of Signal Modeling by Eliminating Ambiguity

Figure 6:
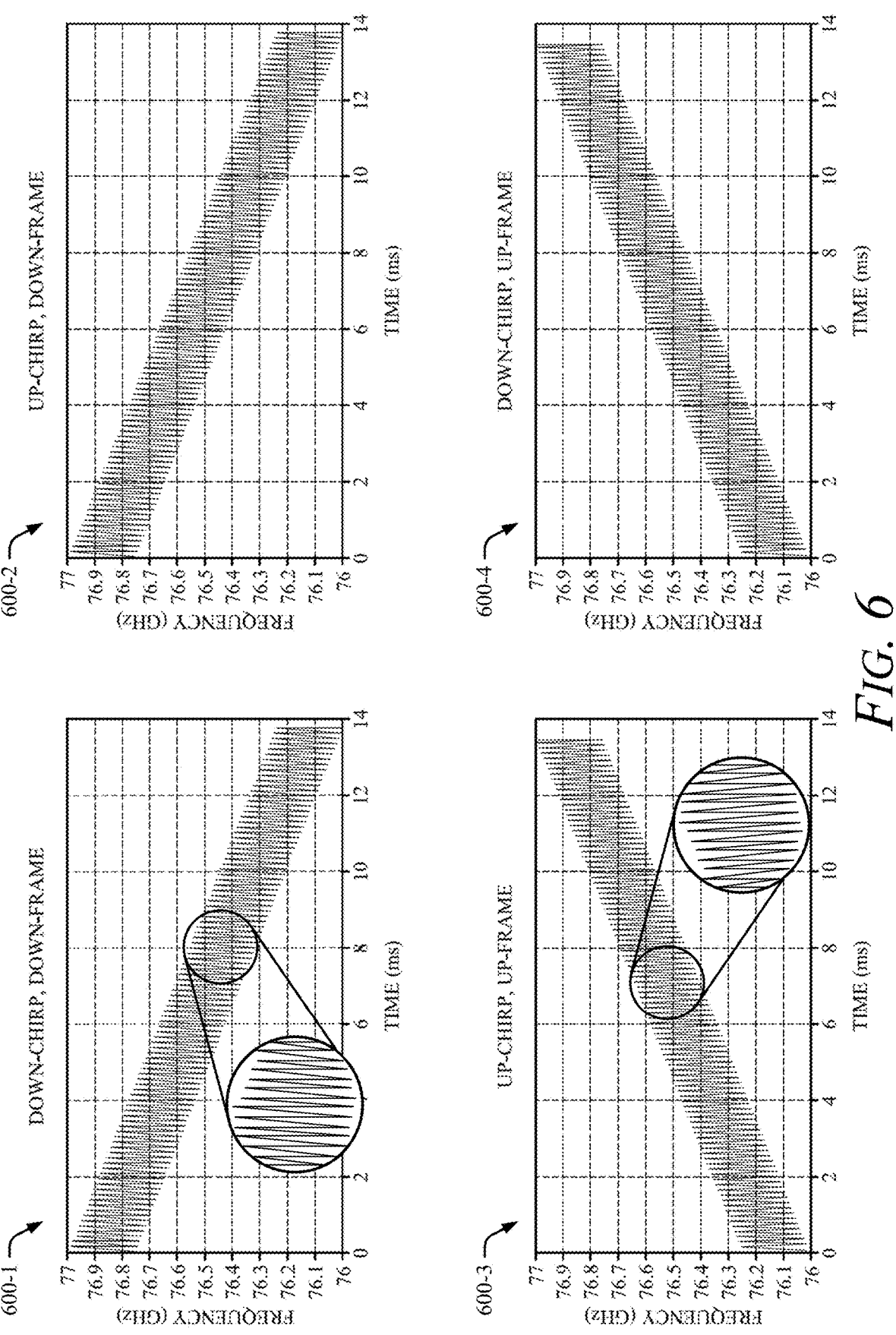
FIGS. 6 through 10 illustrate graphs conveying additional concepts to aid in understanding techniques for interleaving chirps for unambiguous range rate estimation.
Figure 7:
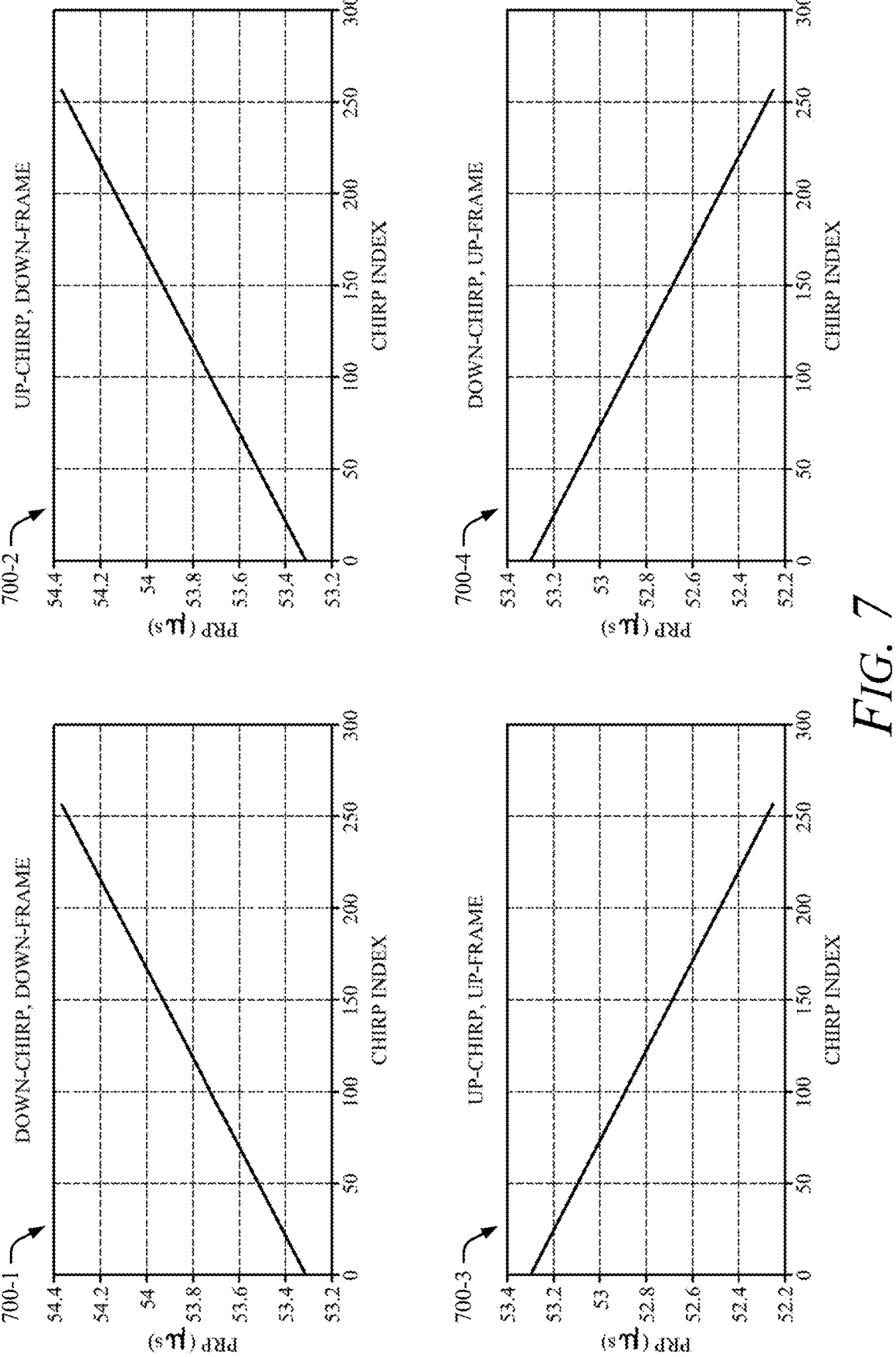
Figure 8:
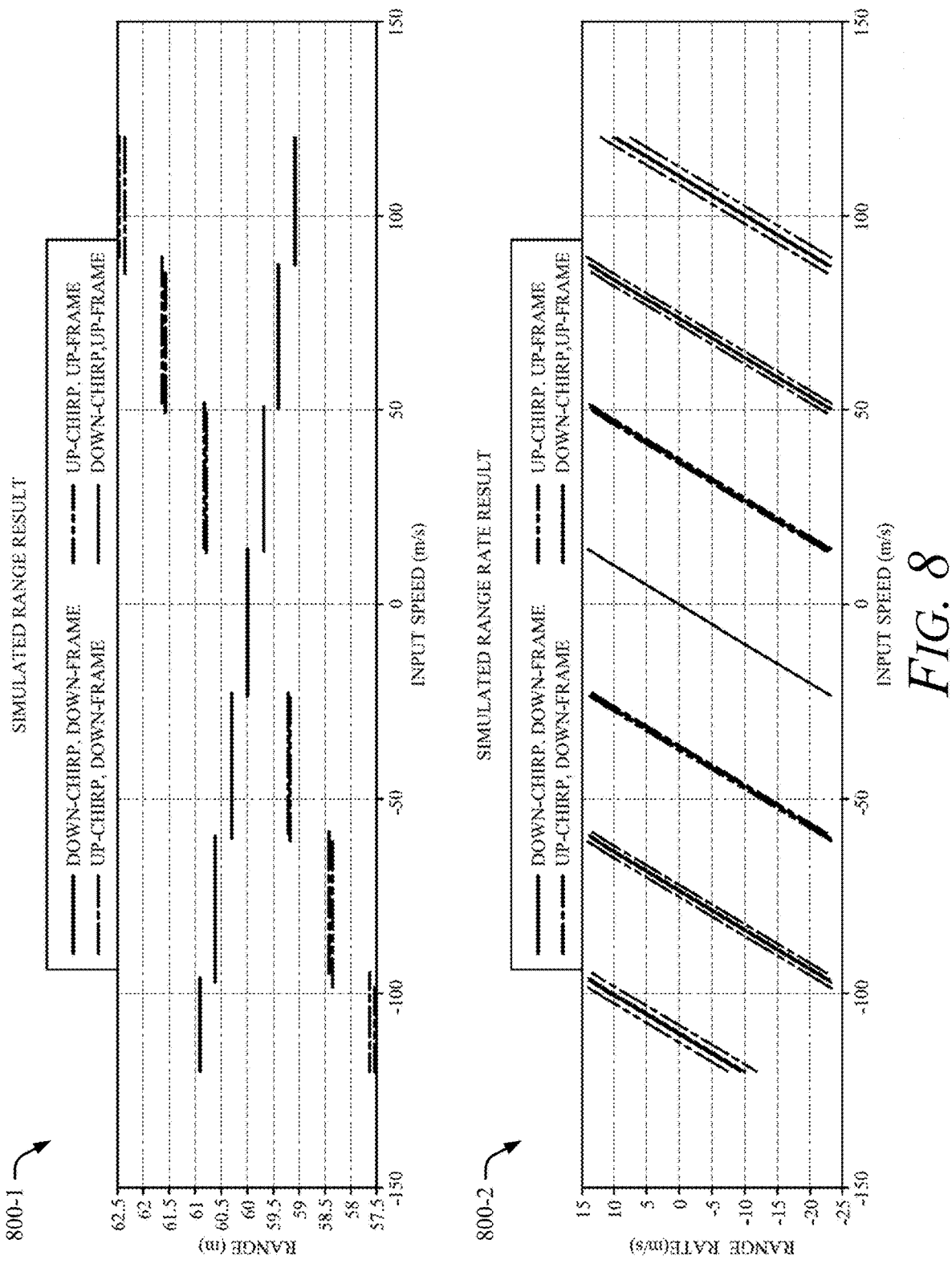

FIGS. 6 through 10 illustrate graphs conveying additional concepts to aid in understanding techniques for interleaving chirps for unambiguous range rate estimation. FIG. 6 includes graphs 600-1 to 600-4, which each illustrate an example of using up-chirps or down-chirps, alone, in either an up frame or down frame of a radar signal. The graph 600-1 includes a down frame with down-chirps, the graph 600-2 includes up-chirps in a down frame, the graph 600-3 includes an up frame with up-chirps, and the graph 600-4 includes down-chirps in an up frame. FIG. 7 includes graphs 700-1 to 700-4, which correspond to PRP charts for the example radar signals shown in FIG. 6. FIG. 8 shows results of using either of these four different example radar signal waveforms, which result in ambiguity at different speeds. Aliasing conditions are apparent in graphs 800-1 and 800-2 where instead of a constant range or range rate, the estimates are variable depending on vehicle speed.

Figure 9:
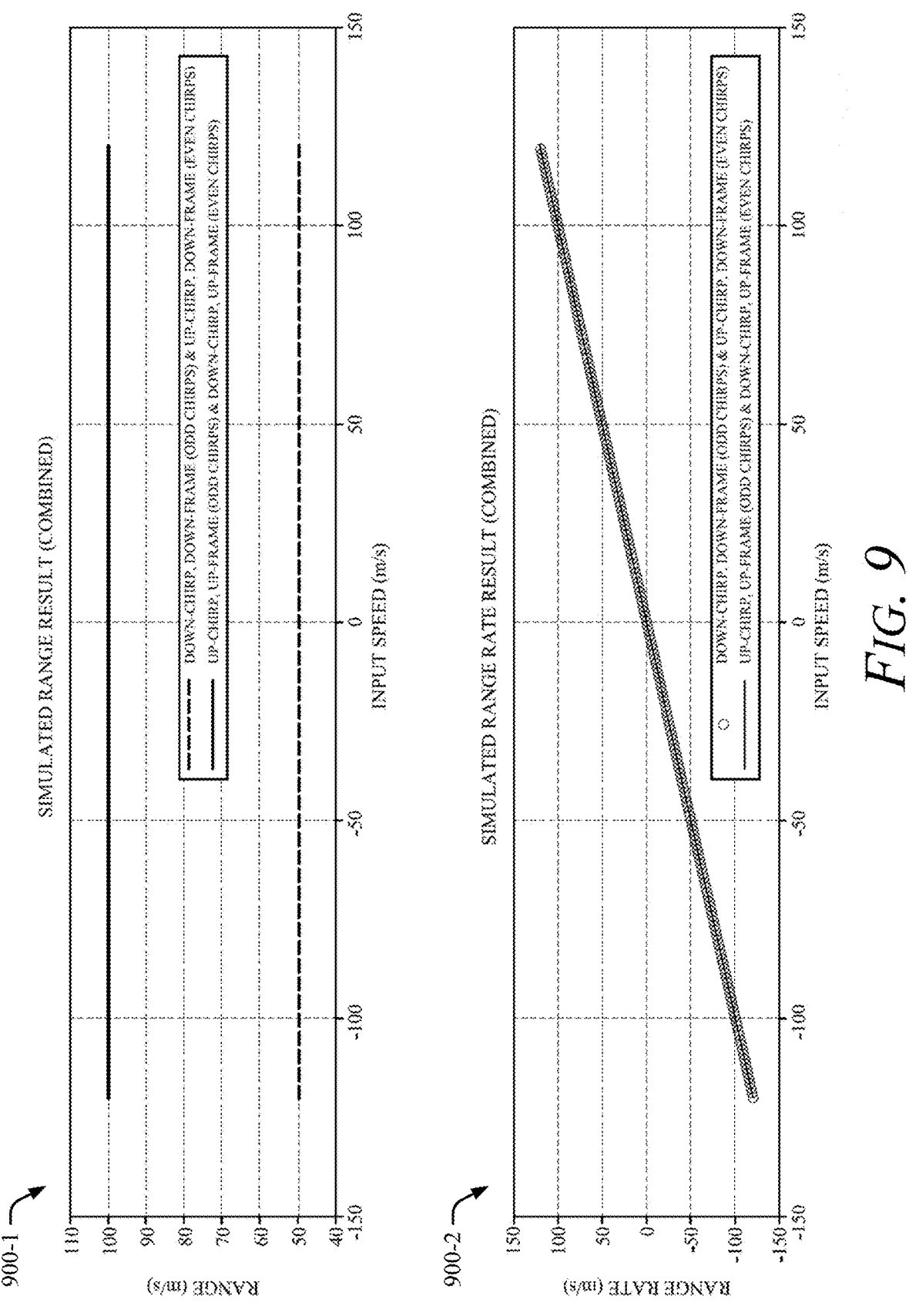
Figure 10:
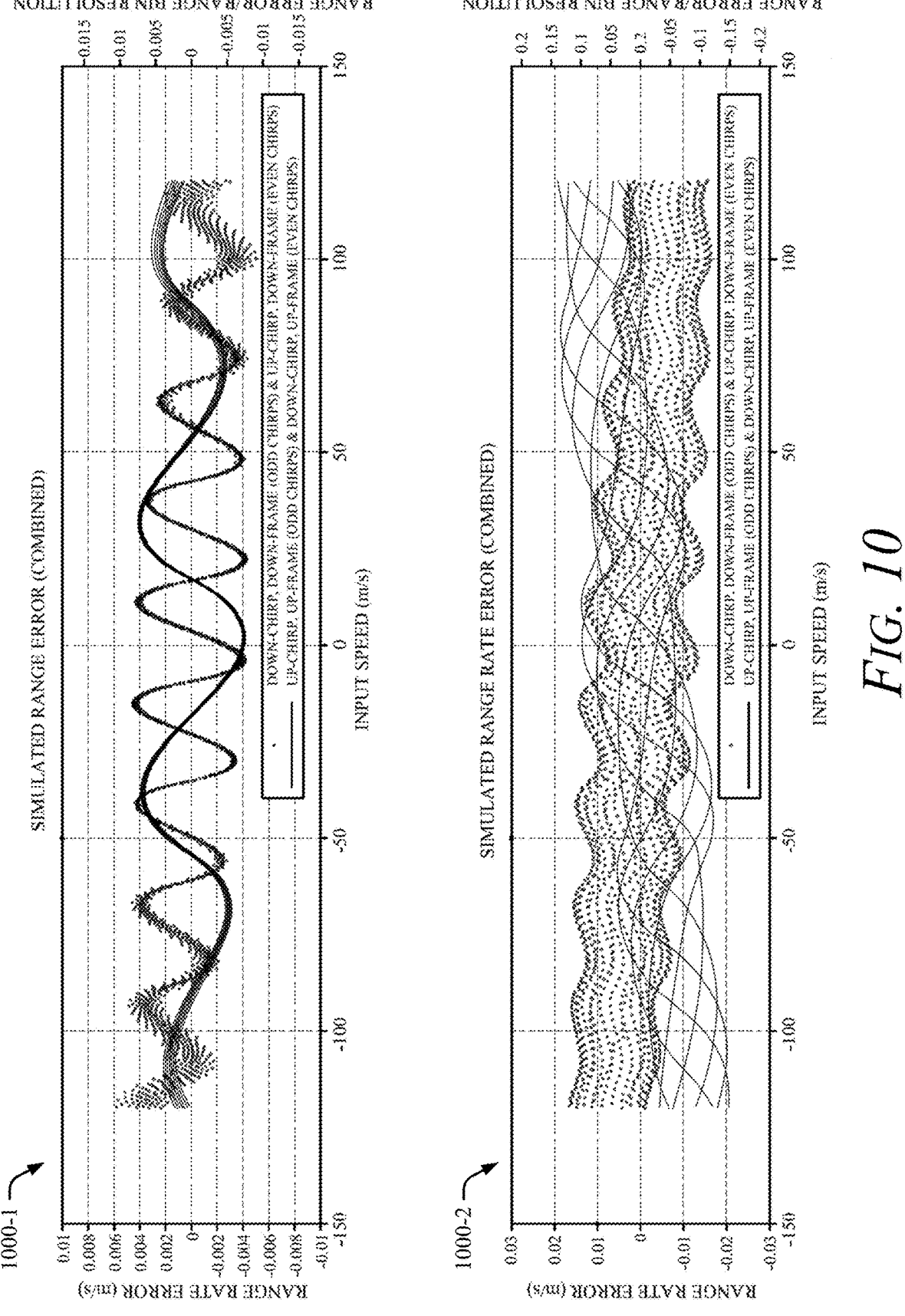

In contrast to the graphs 800-1 and 800-1, FIG. 9 shows results of applying the techniques of this disclosure to eliminate ambiguity from estimates of range and range rate. Each of graphs 900-1 and 900-2 demonstrate consistent and precise estimates of range, even as objects or vehicle change speeds. As is shown in FIG. 11, graphs 1000-1 and 1000-2 show an amount of error in range rates estimated using the described techniques is greatly reduced. A magnitude of errors in range rate estimates appears bound to a predictable, narrow region, regardless of speed of the radar system 104, the vehicle 102, or the object 108 being detected.

ADDITIONAL EXAMPLES

Some additional examples are as follows.

Example 1: A method comprising: transmitting, from a radar system, radar signals for a frame by interleaving two different groups of chirps into an ordered sequence of chirps such that each consecutive pair of chirps includes an initial chirp from one of the two groups and a subsequent chirp from the other of the two groups; identifying, based on radar returns obtained in response to transmission of the radar signals, initial range and Doppler measurements for each of the two groups; selecting, from among a plurality of ambiguity terms used for unambiguously estimating range rates for detections, an ambiguity term for each of the two groups, the ambiguity term for each of the two groups being selected independently based on the initial range and Doppler measurements for that group; and using, by the radar system, the ambiguity term selected for the two groups to estimate an unambiguous range rate for detections associated with either of the two groups.

Example 2: The method of any other example, wherein one of the two groups includes up-chirps that that increase in frequency during transmission, and the other of the two groups includes down-chirps that decrease in frequency during transmission.

Example 3: The method of any other example, wherein: one of the two groups comprises odd chirps and the initial chirp is the up-chirp, and the other of the two groups comprises even chirps and the subsequent chirp is the down-chirp; or the initial chirp is the down-chirp, and the subsequent chirp is the up-chirp.

Example 4: The method of any other example, wherein the frame comprises an up frame that shifts the ordered sequence of chirps higher in frequency during transmission of the frame.

Example 5: The method of any other example, wherein the frame comprises a down frame that shifts the ordered sequence of chirps lower in frequency during transmission of the frame.

Example 6: The method of any other example, wherein the plurality of ambiguity terms include at least one integer greater than zero or less than zero.

Example 7: The method of any other example, wherein selecting the ambiguity term for each of the two groups comprises: computing, based on the initial the range and Doppler measurements for a first group of the two groups, an ambiguity variable for the first group; and selecting, from among the plurality of ambiguity terms that is nearest in value to the ambiguity variable for the first group, a corresponding ambiguity term for the first group.

Example 8: The method of any other example, wherein selecting the ambiguity term for each of the two groups comprises: computing, based on the initial the range and Doppler measurements for a first group of the two different groups, a first ambiguity variable for the first group; and computing, based on the initial the range and Doppler measurements for a second group of the two different groups, a second ambiguity variable for the second group.

Example 9: The method of any other example, further comprising: selecting, from among the plurality of ambiguity terms that is nearest in value to the ambiguity variable for the first group, a first ambiguity term for the first group; and selecting, from among the plurality of ambiguity terms that is nearest in value to the ambiguity variable for the second group, a second ambiguity term for the second group.

Example 10: The method of any other example, wherein at least one of the first ambiguity term selected or the second ambiguity term selected is not zero.

Example 11: The method of any other example, further comprising: outputting, from the radar system, and to a component of a vehicle, the unambiguous range rate for at least some of the detections to enable tracking or other radar dependent functions executing on the vehicle.

Example 12: A computer-readable storage media comprising instructions that, when executed, cause a processor to perform the method of any of the previous examples.

Example 13: A system comprising a processor configured to perform the method of any of the previous examples.

Example 14: The system as recited by any of the previous examples, the system comprising a radar system for a vehicle.

Example 15: The system as recited by any of the previous examples, the system comprising the vehicle.

Example 16: A system comprising means for performing the method as recited by any previous example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure. Although described with respect to specific radar system elements, the techniques, apparatuses, and systems of the present disclosure offer plug and play compatibility with other radar systems.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:

transmitting, from a radar system, radar signals for a frame by interleaving two different groups of chirps, including a first group and a second group, into an ordered sequence of chirps such that each consecutive pair of chirps includes an initial chirp from the first group and a subsequent chirp from the second group, one of the two groups including up-chirps that increase in frequency during transmission and the other of the two groups including down-chirps that decrease in frequency during transmission;

identifying, based on radar returns obtained in response to transmission of the radar signals, initial range and Doppler measurements of peak detections associated with each of the two groups for the frame;

selecting, from among a plurality of ambiguity terms used for unambiguously estimating range rates for detections, a first ambiguity term associated with the first group of chirps and a second ambiguity term associated with the second group of chirps, the first and second ambiguity terms being selected independently, with the first ambiguity term being selected based on the initial range and Doppler measurements of the peak detections only from the first group of chirps and the second ambiguity term being selected based on the initial range and Doppler measurements only from the second group of chirps; and using, by the radar system, the ambiguity term selected for each of the two groups to estimate an unambiguous range rate for detections associated with each of the two groups.

2. The method of claim 1, wherein:

one of the two groups comprises odd chirps and the initial chirp is the up-chirp, and the other of the two groups comprises even chirps and the subsequent chirp is the down-chirp; or the initial chirp is the down-chirp, and the subsequent chirp is the up-chirp.

3. The method of claim 1, wherein the frame comprises an up frame that shifts the ordered sequence of chirps higher in frequency during transmission of the frame.

4. The method of claim 1, wherein the frame comprises a down frame that shifts the ordered sequence of chirps lower in frequency during transmission of the frame.

5. The method of claim 1, wherein the plurality of ambiguity terms include at least one integer greater than zero or less than zero.

6. The method of claim 1, wherein selecting the ambiguity term for the two groups comprises:

computing, based on the initial range and Doppler measurements for the first group, a first ambiguity variable for the first group;

selecting, from among the plurality of ambiguity terms that is nearest in value to the first ambiguity variable, the first ambiguity term for the first group;

computing, based on the initial range and Doppler measurements for the second group, a second ambiguity variable for the second group; and selecting, from among the plurality of ambiguity terms that is nearest in value to the second ambiguity variable, the second ambiguity term for the second group.

7. The method of claim 1, wherein at least one of the first ambiguity term selected or the second ambiguity term selected is not zero.

8. The method of claim 1, further comprising:

outputting, from the radar system, and to a component of a vehicle, the unambiguous range rate for at least some of the detections to enable tracking or other radar dependent functions executing on the vehicle.

9. A non-transitory computer-readable storage media comprising instructions that, when executed, cause a processor to:

transmit, from a radar system, radar signals for a frame by interleaving two different groups of chirps, including a first group and a second group, into an ordered sequence of chirps such that each consecutive pair of chirps includes an initial chirp from the first group and a subsequent chirp from the second group, one of the two groups including up-chirps that that increase in frequency during transmission and the other of the two groups including down-chirps that decrease in frequency during transmission;

identify, based on radar returns obtained in response to transmission of the radar signals, initial range and Doppler measurements of peak detections associated with each of the two groups for the frame;

select, from among a plurality of ambiguity terms used for unambiguously estimating range rates for detections, a first ambiguity term associated with the first group of chirps and a second ambiguity term associated with the second group of chirps, the first and second ambiguity terms being selected independently, with the first ambiguity term being selected based on the initial range and Doppler measurements of the peak detections only from the first group of chirps and the second ambiguity term being selected based on the initial range and Doppler measurements only from the second group of chirps; and use the ambiguity term selected for each of the two groups to estimate an unambiguous range rate for detections associated with each of the two groups.

10. A system comprising a processor configured to:

transmit radar signals for a frame by interleaving two different groups of chirps, including a first group and a second group, into an ordered sequence of chirps such that each consecutive pair of chirps includes an initial chirp from the first group and a subsequent chirp from the second group;

identify, based on radar returns obtained in response to transmission of the radar signals, initial range and Doppler measurements of peak detections associated with each of the two groups, one of the two groups including up-chirps that increase in frequency during transmission and the other of the two groups including down-chirps that decrease in frequency during transmission;

select, from among a plurality of ambiguity terms used for unambiguously estimating range rates for detections, a first ambiguity term associated with the first group of chirps and a second ambiguity term associated with the second group of chirps, the first and second ambiguity terms being selected independently, with the first ambiguity term being selected based on the initial range and Doppler measurements of the peak detections only from the first group of chirps and the second ambiguity term being selected based on the initial range and Doppler measurements only from the second group of chirps; and use the ambiguity term selected for each of the two groups to estimate an unambiguous range rate for detections associated with each of the two groups.

11. The system of claim 10, wherein:

the initial chirp is the up-chirp, and the subsequent chirp is the down-chirp; or the initial chirp is the down-chirp, and the subsequent chirp is the up-chirp.

12. The system of claim 10, wherein the processor is further configured to:

compute, based on the initial range and Doppler measurements for the first group, a first ambiguity variable for the first group;

select, from among the plurality of ambiguity terms that is nearest in value to the first ambiguity variable, the first ambiguity term for the first group;

compute, based on the initial range and Doppler measurements for the second group, a second ambiguity variable for the second group; and select, from among the plurality of ambiguity terms that is nearest in value to the second ambiguity variable, the second ambiguity term for the second group.

13. The system of claim 10, wherein at least one of the first ambiguity term selected or the second ambiguity term selected is not zero.

14. The system of claim 10, wherein the processor is further configured to:

output, to a component of a vehicle, the unambiguous range rate for at least some of the detections to enable tracking or other radar dependent functions executing on the vehicle.

* * * * *